Figure 4:
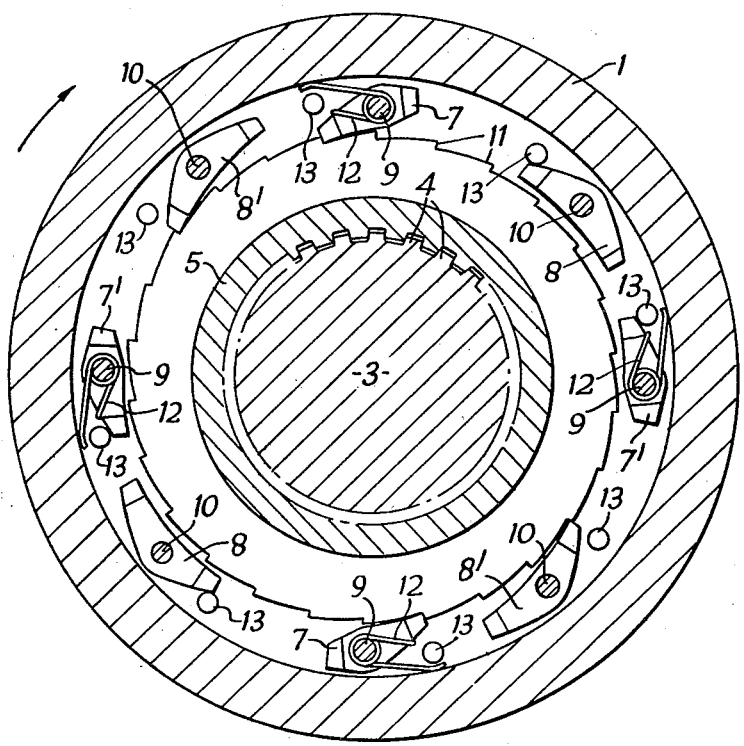

July 27, 1965
H. A. CLEMENTS
3,197,001
ROTARY SYNCHRONOUS CLUTCHES
Filed March 22, 1963
3 Sheets-Sheet 1
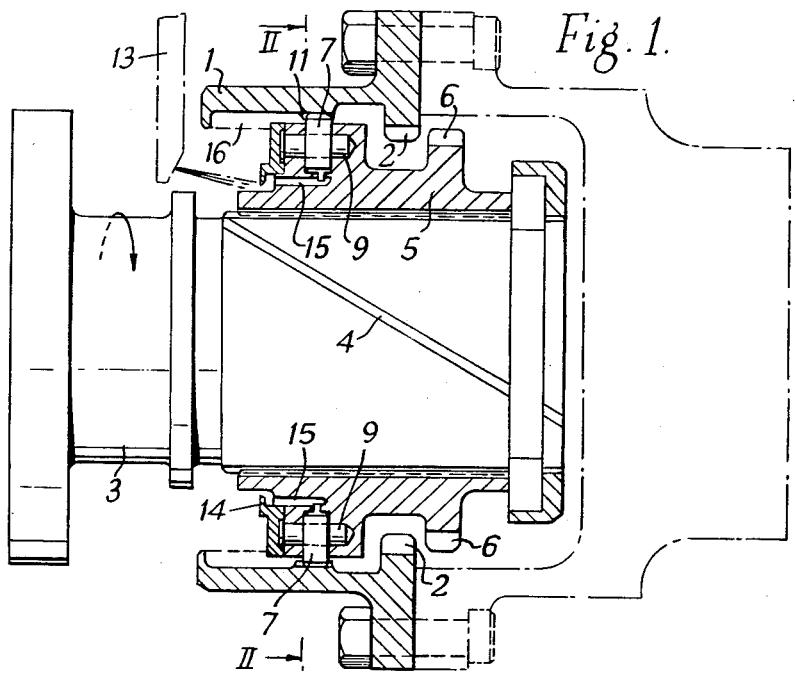
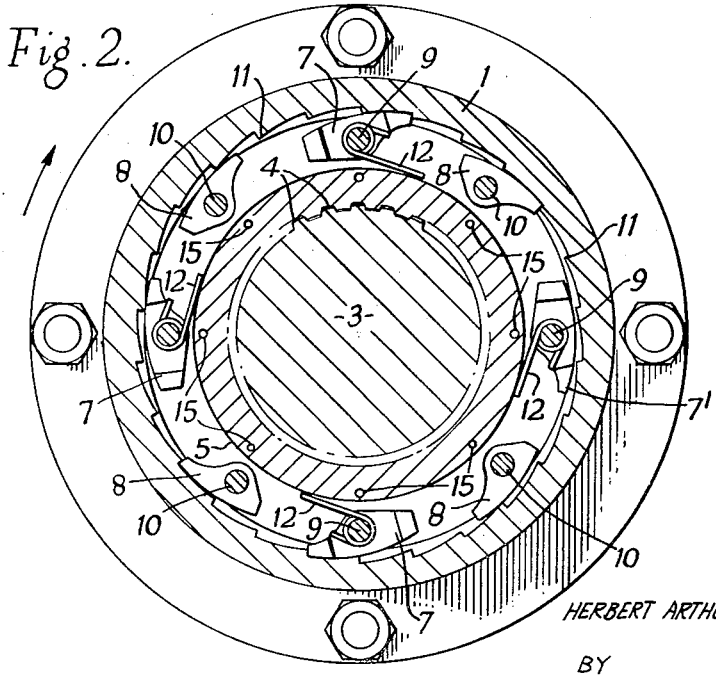
INVENTOR
HERBERT ARTHUR CLEMENTS
BY
Benjamin Sweedler
ATTORNEY

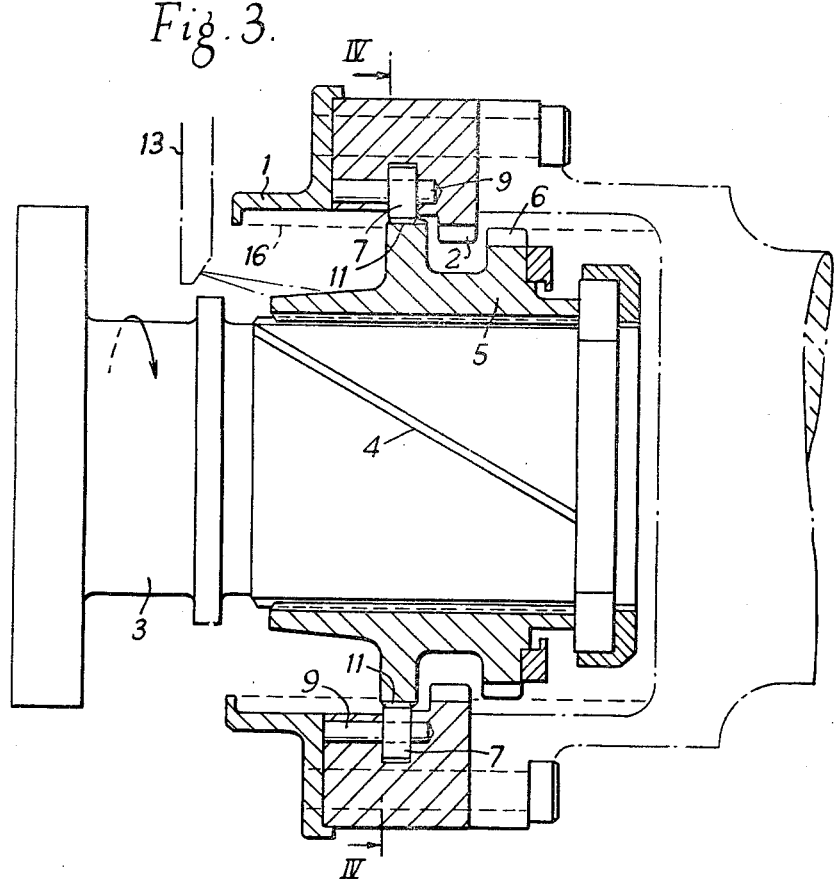

United States Patent Office 3,197,001
Patented July 27, 1965

3,197,001
ROTARY SYNCHRONOUS CLUTCHES
Herbert Arthur Clements, Weybridge, England, assignor to S.S.S. Patents Limited, Richmond, Surrey, England, a British company
Filed Mar. 22, 1963, Ser. No. 267,078
Claims priority, application Great Britain, Mar. 26, 1962, 11,523/62
3 Claims. (Cl. 192—67)

This invention relates to synchronous self-shifting clutches of the type comprising a first rotary clutch member with clutch teeth, a second rotary clutch member, an intermediate member provided with clutch teeth and constrained for helical movement relative to the second clutch member to bring its clutch teeth into and out of engagement with the clutch teeth of the first clutch member, and pawl and ratchet mechanism for initiating precise interengagement of the clutch teeth upon relative rotation of said first and second clutch members in one direction.

In some applications of synchronous self-shifting clutches, e.g. in an engine-driven change speed gearbox having two clutches associated respectively with the low speed and high speed gear ratios, the operating conditions may entail long periods of ratchetting of a clutch when disengaged, with the first and second clutch members rotating at different speeds as determined by the low and high speed ratios of the gear system and by the rotational speed of the driving engine, and this may involve fatigue problems in connection with the control springs or other such means with which the pawls are provided for urging them into ratchetting engagement with the associated ratchet teeth.

An object of the invention is to provide a clutch of the type referred to above which is capable of ratchetting for long periods without any spring fatigue problem arising.

In accordance with the invention there is provided a synchronous self-shifting clutch comprising a first rotary clutch member provided with clutch teeth, a second rotary clutch member, an intermediate member provided with clutch teeth, means constraining said intermediate member for helical movement relative to said second clutch member to bring its clutch teeth into and out of engagement with the clutch teeth of the first clutch member, the clutch also comprising pawl and ratchet mechanism for initiating precise interengagement of the clutch teeth in one direction of relative rotation of said first and second clutch members, said mechanism comprising ratchet teeth carried by the first clutch member or intermediate member, and at least one primary pawl and at least one secondary pawl carried by the intermediate member or by the first clutch member, said primary pawl having means urging it in the sense for ratchetting engagement and having a weight distribution such that above a predetermined angular speed of the member by which it is carried centrifugal force renders it incapable of ratchetting, and said secondary pawl having a weight distribution such that above a predetermined speed, which may be below said first-mentioned speed, of the member by which it is carried, centrifugal force urges it into a position in which it is capable of ratchetting.

In addition to the elimination of the spring fatigue problem, an advantage of the clutch according to the invention is that the primary and secondary pawls may be in substantially the same radial plane at right angles to the clutch axis and the clutch may therefore be short in length as compared with a clutch in which the primary and secondary pawls are displaced axially relatively to one another.

A clutch according to the invention may advantageously be used in conjunction with plants comprising a motor driven compressor with a standby steam turbine connected through the clutch to drive the compressor if the power supply of the motor should fail. In such a case the turbine may be kept idling continuously at reduced speed to keep it warm ready for immediate service and the clutch would have to ratchet continuously for months on end. Only the secondary pawls which have no springs would be in action, the primary pawls having weak springs, being disengaged centrifugally.

Embodiments of the invention are illustrated in the accompanying drawings, in which
FIG. 1 is a view in longitudinal section of a clutch according to the invention, in which the primary and secondary pawls are carried by the intermediate member of the clutch,
FIG. 2 is a section on the line II—II of FIG. 1,
FIG. 3 is a view in longitudinal section of another clutch according to the invention, in which the primary and secondary pawls are carried by the first clutch member, and
FIG. 4 is a section on the line IV—IV of FIG. 3.

Referring to FIGS. 1 and 2, the clutch shown comprises a first clutch member 1 with a ring of internal clutch teeth 2, and a second clutch member 3 formed with external right-hand helical splines 4. The intermediate member 5, which has internal helical splines engaged with the splines 4, has a ring of external clutch teeth 6 and carries a ring of pawls 7 and 8 which are mounted on pawl pins 9 and 10 respectively and the noses of which are similarly directed, and the first clutch member 1 carries a ring of ratchet teeth 11. The pawls 7, which alternate with the pawls 8, are primary pawls and are provided with control springs 12 which urge the primary pawls 7 in the sense for co-operation with the ratchet teeth 11 and they have a weight distribution about their pivot points such that they are tail heavy so that above a predetermined angular speed of the second clutch member 3 the pawls 7 tend to turn on their pins 9 under the action of centrifugal force against the action of their control springs 12 to positions in which they are incapable of ratchetting, as shown at 7'. The other pawls 8 are secondary pawls with a weight distribution about their pivot points such that they are slightly nose heavy so that at angular speeds of the second clutch member 3 above a predetermnied speed, which may be below the speed at which the primary pawls 7 tend to disengage, the secondary pawls 8 are urged by centrifugal force into the positions shown in which they are capable of ratchetting relative to the ratchet teeth 11. Oil is supplied from a pipe 13 to the interior of a ring 14 and thence via ducts 15 to the interior of the member 1 to lubricate the pawls and the ratchet teeth, the oil forming a ring 16 when the first clutch member 1 is rotating.

Assume the direction of rotation to be as shown by the arrows, and that the first clutch member 1 is rotating at high speed faster than the second clutch member 3. With the second clutch member 3 and hence the intermediate member 5 stationary or rotating at below a predetermined speed in the direction of the arrows the primary pawls 7 ratchet relative to the ratchet teeth 11 under the action of their springs 12, whereas the secondary pawls 8 are inert, the noses of the pawls 8 being urged away from the ratchet teeth 11 by the action of the rotating ring of oil 16. Under these conditions clutch engagement occurs if the first clutch member 1 is decelerated so that primary pawls 7 engage ratchet teeth 11 and the intermediate member 5 is drawn helically into toothed engagement with the first clutch member 1. With the second clutch member 3 and hence the intermediate member 5 rotating at above a predetermined speed the noses of the primary pawls 7 are withdrawn by centrifugal force from ratchetting relationship with the ratchet teeth 11, and the noses of the secondary pawls 8 are urged by centrifugal force into ratchetting relationship with the ratchet teeth 11. If the second clutch member 3 then tends to overtake the first clutch member 1, or the first clutch member 1 is decelerated, secondary pawls 8 will engage ratchet teeth 11 whereby to shift the intermediate member 5 helically relative to the second clutch member 3 to engage the clutch teeth 6 with the clutch teeth 2.

In FIGS. 3 and 4 parts corresponding to parts of the clutch shown in FIGS. 1 and 2 have been given the same reference numerals. In FIGS. 3 and 4, the primary pawls 7 and the secondary pawls 8 are all carried by the first clutch member 1. The primary pawls 7 are made nose heavy so that a predetermined angular speed of the first clutch member 1 they turn about their pivot pin 9 under the action of centrifugal force acting against their springs 12, the angular movement of the pawls being limited by stop pins 13, in the direction to withdraw their noses from the ratchet teeth 11, as shown at 7', and the secondary pawls 8 are made tail heavy so that at a predetermined angular speed of the clutch member 1 they are urged by centrifugal force into ratchetting relationship with the ratchet teeth 11, as shown at 8'. The operation of the clutch is similar to that of the clutch shown in FIGS. 1 and 2.

I claim:

1. A synchronous self-shifting clutch comprising a first rotary clutch member, clutch teeth, carried by said first clutch member, a second rotary clutch member, an intermediate member, clutch teeth, carried by said intermediate member, means constraining said intermediate member for helical movement relative to said second clutch member to bring its clutch teeth into and out of engagement with the clutch teeth of said first clutch member, the clutch also comprising pawl and ratchet mechanism for initiating precise inter-engagement of the clutch teeth of said first and intermediate clutch members, said mechanism comprising ratchet teeth carried by one of said first and intermediate clutch members, and at least one primary pawl and at least one secondary pawl carried by the other of said intermediate and first clutch members, and means urging said primary pawl in the sense for ratchetting engagement with said ratchet teeth, said primary pawl having a weight distribution such that above a predetermined angular speed of the clutch member by which it is carried centrifugal force renders it incapable of ratchetting, and said secondary pawl having a weight distribution such that above a predetermined angular speed of the clutch member by which it is carried, centrifugal force urges it into a position in which it is capable of ratchetting.

2. A clutch according to claim 1 wherein said primary and secondary pawls are mounted in substantially the same plane at right angles to the clutch axis.

3. A clutch according to claim 1 wherein the angular speed, of the member carrying said pawls, above which centrifugal force urges said secondary pawl in a position in which it is capable of ratchetting is below the angular speed of said member above which centrifugal force renders said primary pawl incapable of ratchetting.

References Cited by the Examiner

UNITED STATES PATENTS 2,971,621 2/61 Sinclair et al.
3,093,226 6/63 Basebe et al.

DAVID J. WILLIAMOWSKY, *Primary Examiner.*